Oct. 5, 1965    J. P. SOLTAU    3,210,161
COMBUSTION APPARATUS
Filed May 14, 1964
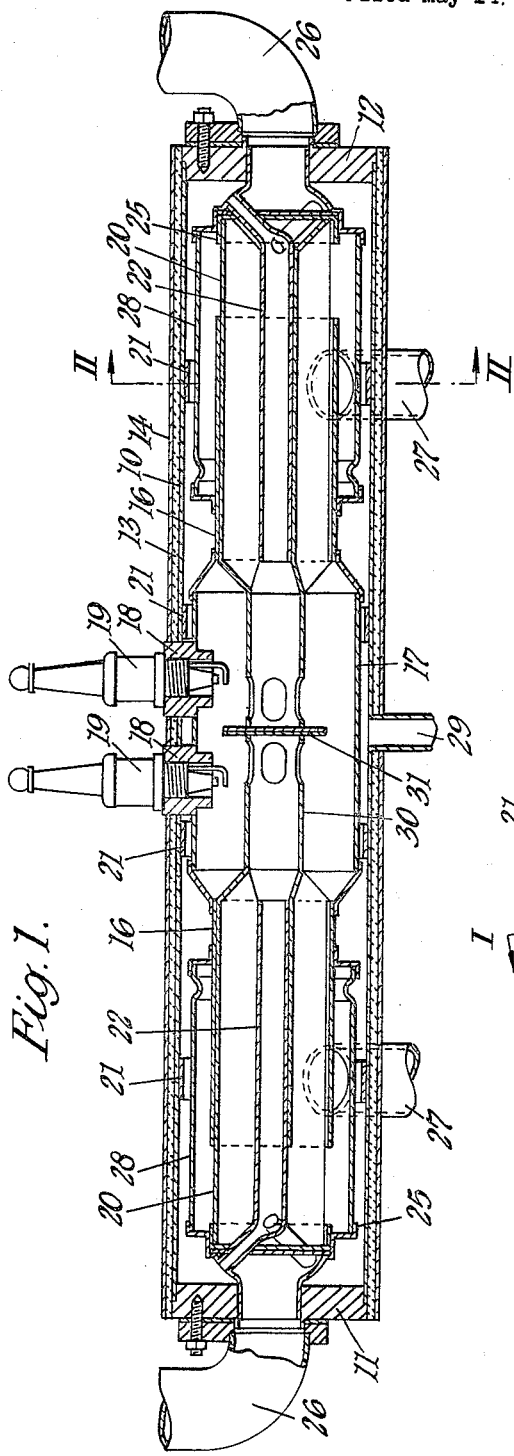
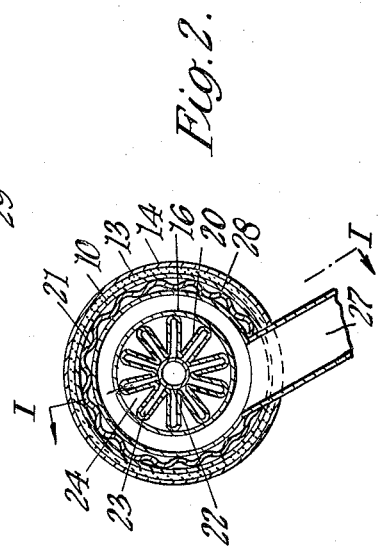

3,210,161
COMBUSTION APPARATUS
John Peter Soltau, Dorridge, Solihull, England, assignor to Joseph Lucas (Industries) Limited, Birmingham, England
Filed May 14, 1964, Ser. No. 367,465
Claims priority, application Great Britain, June 18, 1963, 24,175/63
1 Claim. (Cl. 23—277)

It is well known that internal combustion engines exhaust noxious gases due to incomplete combustion within the engine cylinders, and the object of this invention is to provide convenient combustion apparatus for incorporation in the exhaust system of an internal combustion engine whereby at least a proportion of the various gases can be burnt, the apparatus being of a type particularly suitable for engines having a double exhaust system.

Combustion apparatus according to the invention comprises an elongated outer casing, an elongated inner casing mounted in spaced relationship within the outer casing, a pair of exhaust gas inlets opening into opposite ends of the inner casing respectively, a combustion chamber defined intermediate the ends of the inner casing, a perforated tubular piece, serving to define a mixing zone, and mounted in spaced relationship within the combustion chamber, a pair of tubular members extending from opposite ends of the inner casing respectively to positions adjacent the ends of the perforated tubular piece, said tubular members being in communication with the space defined between the inner and outer casings, an air inlet to said space, a pair of dividing means interposed between the tubular members and the inner casings respectively, said dividing means serving to define passages whereby the exhaust gas inlets are placed in communication with opposite ends respectively of the perforated tubular piece and the combustion chamber is placed in communication with a pair of outlets extending through the outer casing.

An example of the present invention will now be described with reference to the accompanying drawings in which:

FIGURE 1 is a cross-sectional view taken on the line 1—1 in FIGURE 2 and,

FIGURE 2 is a cross-sectional view on the line 2—2 in FIGURE 1.

In this example there is provided a combustion apparatus comprising an elongated cylindrical outer casing 10 which is closed at its ends by members 11, 12 and which is formed from sheet metal having an outer covering of heat resisting material indicated at 13 and the latter covering is encased in a further cylindrical sheet metal casing 14. Mounted in spaced relationship within the outer casing 10 and supported by corrugated strips 21 is an inner sheet metal casing 15 which comprises a pair of tubular elements 16 located in opposite halves of the outer casing, which are secured to the opposite ends respectively of a tubular element 17 of larger diameter than said pair of tubular elements 16. The single tubular element 17 defines a combustion chamber into which extends a pair of internally screw threaded bosses 18 for mounting electrically operable igniters, indicated at 19.

Within said pair of tubular elements 16 are mounted a pair of longitudinally corrugated sheets 20 respectively which serve to support internally thereof, a pair of longitudinally extending tubular members 22 respectively. The corrugated sheets 20 define between the respective tubular elements 16 and members 22, two series of longitudinal passages 23, 24 respectively. Moreover the corrugated sheets 20 extend beyond the outer ends of the tubular elements 16 and are provided with a pair of end closure caps 25 respectively, which serve to close the outer ends of the one series of passages 24, which are defined by the tubular elements 16 and the troughs of the sheets 20. The outer ends of the other series of passages 23 are in communication with a pair of exhaust gas inlets 26 which extend through the end members 11, 12 respectively of the outer casing 10 and which are adapted for connection to the exhaust pipes of an engine. Moreover, the outer ends of the one series of passages 24 are in communication with a pair of outlets 27 which extend through the outer casing 10 and which open out of a pair of chambers respectively defined by cylindrical members 28 around the tubular elements 16. Furthermore the outer ends of the tubular members 22 are in communication with the space defined between the inner and outer casings and this space is provided with an air inlet at any suitable position on the outer casing, such as that shown at 29.

Supported within the combustion chamber 17 is a perforated tubular piece 30 carrying a central baffle 31, the ends of the perforated tubular piece being in communication with the inner ends of the other series of passages 23. Moreover the inner ends of the tubular members 22 extend to a point adjacent the ends of the tubular piece 30, which serves to define a mixing zone as will be described. Furthermore the combustion chamber 17 is in communication with the inner ends of the one series of passages 24 and the arrangement is such that exhaust gases from the engine enter the mixing zone via said other series of passages 23, where they are mixed with air entering the zone via the tubular members 22. From the mixing zone the gases pass through the perforated tubular piece 30 to the combustion chamber 17 where they are ignited by the igniters 19. From the combustion chamber the purified gases pass via said one series of passages 24 to the outlets 27. Moreover during the flow of the gases through the passages 24 heat exchange takes place between the purified gases and the incoming exhaust gases and to a lesser extend between the air and purified gases and because of this the efficiency of the apparatus is improved. Although an igniter is provided to initiate combustion it is anticipated that combustion will be self sustaining once the apparatus has attained a working temperature.

Having thus described my invention what I claim as new and desire to secure by Letters Patent is:

Combustion apparatus comprising an elongated outer casing, an elongated inner casing mounted in spaced relationship within the outer casing, a pair of exhaust gas inlets opening into opposite ends of the inner casing respectively, a combustion chamber defined intermediate the ends of the inner casing, a perforated tubular piece serving to define a mixing zone and mounted in spaced relationship within the combustion chamber, a pair of tubular members extending from opposite ends of the inner casing respectively to positions adjacent the ends of the perforated tubular piece, said tubular members being in communication with the space defined between the inner and outer casings, an air inlet to said space, a pair of dividing means interposed between the tubular members and the inner casings respectively, said dividing means serving to define passages whereby the exhaust gas inlets are placed in communication with opposite ends respectively of the perforated tubular piece and the combustion chamber is placed in communication with a pair of outlets extending through the outer casing.

No references cited.

SAMUEL LEVINE, *Primary Examiner.*